United States Patent [19]
Otani et al.

[11] Patent Number: 6,035,844
[45] Date of Patent: Mar. 14, 2000

[54] CUTTING TOOL AND METHOD FOR MAKING THE SAME

[75] Inventors: Ryuji Otani; Isao Fuwa; Masahiro Ikegami; Noboru Kusano, all of Osaka; Toshikazu Hamada; Kyoichiro Nakayama, both of Shiga, all of Japan

[73] Assignee: Matsushita Electric Works, Ltd., Osaka, Japan

[21] Appl. No.: 08/936,730

[22] Filed: Sep. 25, 1997

[30] Foreign Application Priority Data

Sep. 25, 1996 [JP] Japan .................................. 8-252683
Feb. 25, 1997 [JP] Japan .................................. 9-041255
Jul. 15, 1997 [JP] Japan .................................. 9-189980

[51] Int. Cl.$^7$ ...................................................... B28D 1/12
[52] U.S. Cl. .......................... 125/15; 125/22; 76/108.1; 83/835; 83/855
[58] Field of Search ........................ 83/835, 855; 76/25.1, 76/108.1, 108.2, 108.6; 407/118, 119; 125/15, 22

[56] References Cited

U.S. PATENT DOCUMENTS

| | | | |
|---|---|---|---|
| 4,686,080 | 8/1987 | Hara et al. .............................. | 76/108.1 |
| 4,951,762 | 8/1990 | Lundell .................................. | 76/108.2 |
| 5,471,970 | 12/1995 | Sakarcan .................................. | 125/15 |
| 5,662,183 | 9/1997 | Fang ....................................... | 76/108.1 |

FOREIGN PATENT DOCUMENTS 63-43789  2/1988  Japan .
4-52181  8/1992  Japan .

*Primary Examiner*—M. Rachuba
*Attorney, Agent, or Firm*—Armstrong, Westerman, Hattori, McLeland & Naughton

[57] ABSTRACT

A cutting tool is provided which includes a steel metal body and a cemented carbide cutting tip secured to the metal body by a metallic layer. The metallic layer has a high-strength metallic portion and a high-toughness metallic portion. The high-strength metallic portion is made of a metal having a thermal expansion rate between a thermal expansion rate of the metal body and the thermal expansion rate of the cutting tip. The high-toughness metallic portion is located between edge portions of a securing region of the metal body and the cutting tip and has toughness larger than that of the high-strength metallic portion. The cutting tool can decrease the possibility of cracks being generated at the edge portions of the securing region by selecting a thermal expansion rate of the metallic layer so as to decrease the thermal stress caused during the cooling process after welding, and further by positioning a high-toughness metallic layer at the edge portions of the securing region where stress is concentrated and positioning a high-strength metallic layer meeting the strength requirement at the remaining portion of the securing region.

6 Claims, 14 Drawing Sheets

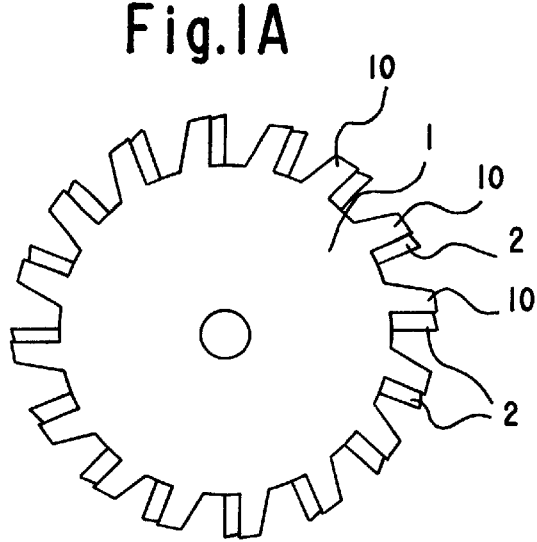
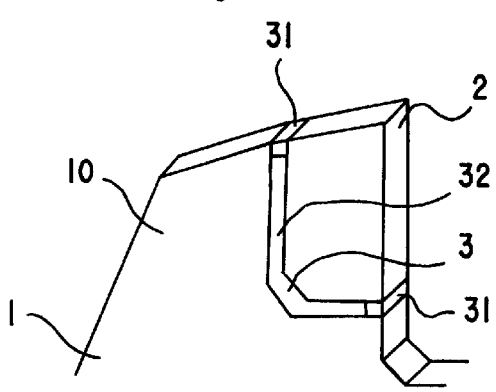
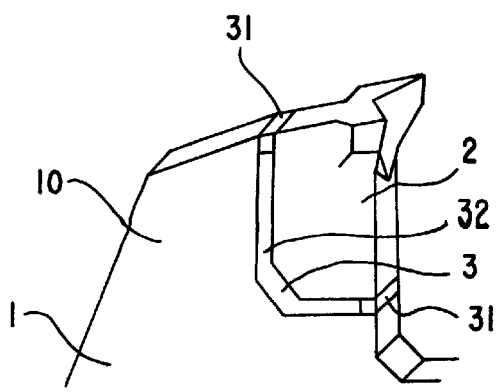
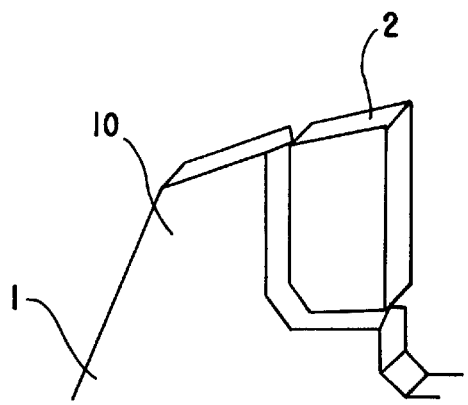
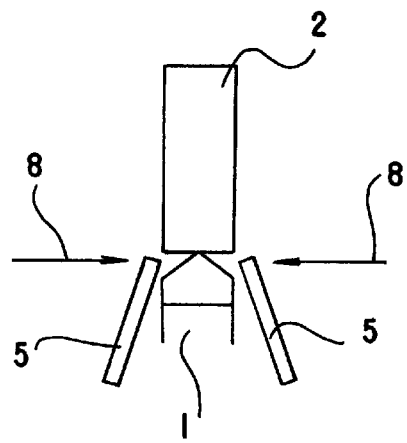

CUTTING TOOL AND METHOD FOR MAKING THE SAME

BACKGROUND OF THE INVENTION

1. Field of the Invention

The present invention relates to a cutting tool having a metal body and a cemented carbide cutting tip secured to the metal body, and also relates to a method for making the cutting tool.

2. Description of the Related Arts

In a cutting tool having a steel metal body and a cemented carbide cutting tip secured to the metal body, the cutting tip is generally secured to the metal body by way of brazing materials such as a silver alloy or similar. In such a cutting tool having a brazed cutting tip, the hardness of the metal body may be lacking due to the heat caused during the brazing process because the metal body is annealed by the heat. Further, the possibility exists that the cutting tip is detached from the metal body where a load to the cutting tip is large. Taking into account the above, as shown in the Japanese unexamined patent publication No. Sho 63-43789 and the Japanese unexamined patent publication No. Hei 4-52181, a cutting tool has been provided which has a metal body and a cutting tip melt-welded to the metal body by applying a high energy beam such as an electron beam or a laser beam or similar. Such a cutting tool can stand considerably heavier load as compared to the above-mentioned cutting tool having a brazed cutting tip.

However, even in the cutting tool having a cutting tip secured to the metal body by applying a high energy beam, cracks may be generated at edge portions of the securing portion between the cutting tip and the metal body when the load exceeds a certain level. Thus, further improvements to the cutting tool can be been expected.

SUMMARY OF THE INVENTION

An object of the present invention is to provide an cutting tool which can stand heavy load and a method for making such a cutting tool.

According to the present invention, a cutting tool includes a steel metal body and a cemented carbide cutting tip secured to the metal body by way of a metallic layer. The metallic layer has a high-strength metallic portion and a high-toughness metallic portion. The high-strength metallic portion is made of a metal having a thermal expansion rate between a thermal expansion rate of the metal body and the thermal expansion rate of the cutting tip. The high-toughness metallic portion is located between edge portions of a securing region of the metal body and the cutting tip and has toughness larger than that of the high-strength metallic portion.

The cutting tool, according to the present invention, can decrease the possibility of causing cracks at the edge portions of the securing region by selecting the thermal expansion rate of the metallic layer so as to decrease thermal stress caused during the cooling process after welding, and further by positioning a high-toughness metallic layer at the edge portions of the securing region where stress is concentrated and a high-strength metallic layer meeting the strength requirement at the rest portion of the securing region.

In this case, the high-strength metallic portion and the high-toughness metallic portion may include at least one common element, and also may include a different main element. In the former case, excellent securing strength can be obtained between the high-strength metallic portion and the high-toughness metallic portion so that defects can be decreased. Also in this case, an alloy, including iron-nickel or Fe-Ni as a main element, may preferably be used in the high-strength metallic portion, and an alloy, including a larger amount of nickel or Ni than in the high-metallic portion, may preferably be used in the high-toughness metallic portion. In the latter case, more preferable material may be used both in the high-strength metallic portion and the high-toughness metallic portion.

Adapting a metallic layer which gradually varies in hardness from the high-strength metallic portion to the high-toughness metallic portion located at the edge portions of the securing region can avoid stress concentration at a boundary region between the high-strength metallic portion and the high-toughness metallic portion, and therefore can obtain preferable results. Adapting a high-strength metallic portion which gradually varies in thermal expansion rate from the metal body side to the cutting tip side can further decrease thermal stress which occurs when cooling after the securing process.

A method for making a cutting tool according to the present invention includes the steps of forming a metallic layer between a steel metal body and a cemented carbide cutting tip such that the metallic layer is different in strength and toughness between edge portions of a securing region of the metal body and the cutting tip and the rest portion, and welding the cutting tip to the metal body by way of the metallic layer. According to the method, the strength and toughness of the metallic layer can easily be adjusted because such adjustments can be done when welding.

When the metallic layer is made of a metal comprising Fe-Ni as a main element and the amount of Ni at the edge portions of the securing region between the body metal and the cutting tip is larger than the amount of Ni at the rest portion of the securing region, altering an amount of Ni in the edge portions of the securing region and the rest portion thereof, in other words altering the strength and the toughness therebetween, can easily be performed.

If a bevel end portion is formed on at least one of the securing surfaces of the metal body and the cutting tip and a bevel angle at both end portions of the bevel end portion is formed larger than a bevel angle at the remaining portion and the cutting tip is welded to the body metal at the bevel end portion by adding Ni or Ni alloy as a filler metal, differentiating the amount of Ni in the edge portions of the securing region from the amount of Ni in the rest portion can be easily performed because the amount of filler metal, i.e., the amount of Ni, becomes larger at the edge portions of the securing region.

Further, if a nickel-plated layer is formed on a cutting tip securing surface of the metal body, and then the cutting tip is welded to the cutting tip securing surface of the metal body by melting the metal body and the nickel-plated layer, differentiating the amount of Ni in the edge portions of the securing region from that in the remaining portion can be more easily performed because Ni contained in the nickel-plated layer formed on the corner and its adjacent surface increases the amount of Ni in the edge portions of the securing region.

Furthermore, if concave portions are formed on the edge portions of the cutting tip securing surface of the metal body and a nickel layer is formed on the cutting tip securing surface of the metal body including the concave portions, and then the cutting tip is welded to the cutting tip securing surface of the metal body by heat-melting the metal body and nickel-plated layer, differentiating the amount of Ni in the edge portions of the securing region from the amount of Ni in the remaining portion can be more easily performed because the nickel layer forms alloy layers each containing a large amount of nickel at the edge portions of the securing region.

Alternatively, a nickel layer comprising nickel or nickel alloy may be formed on at least one of the securing surfaces of the metal body and the cutting tip such that the nickel content in the nickel layer at the edge portions of the securing region is larger than the nickel content in the remaining portion, and then the cutting tip may be welded to the metal body by heat-melting the metal body and the nickel layer.

Further, a nickel layer comprising nickel or nickel alloy may be formed on at least one of the securing surfaces of the metal body and the cutting tip such that the nickel layer of the edge portions of the securing region is thicker than the nickel layer in the remaining portion, and then the cutting tip may be welded to the metal body by heat-melting the metal body and nickel layer to form alloy layers including a large amount of nickel at the edge portions of the securing region. In this case, a nickel layer having a desired thickness distribution can be easily obtained by shaving or cutting the nickel layer after the nickel layer is formed by plating or spraying.

A thin metal plate comprising nickel or nickel alloy may be disposed between the securing surfaces of the metal body and the cutting tip such that edges of the plate protrudes from a predetermined securing region of the metal body and the cutting tip, and then the cutting tip may be welded to the metal body by heat-melting the metal body and the plate. This also enables easy differentiation of the nickel amount between the edge portions of the securing region and the remaining portion.

When a cemented carbide cutting tip is welded to a steel metal body by way of a metallic layer, the metallic layer may comprise different metals including different elements between the edge portions of the securing region of the metal body and the cutting tip and the remaining portion. This easily enables the formation of an extremely high-strength metallic portion and an extremely high-toughness metallic portion. In this case, the high-toughness metal and the high-strength metal may be disposed at the edge portions of the securing region and the remaining portion, respectively, and the high-strength metal may be melted so as to weld the cutting tip to the metal body as well as the high-toughness metal may be melted by the melting heat of the high-strength metal. This can prevent the high-toughness metal from sudden boiling without the necessity of controlling temperature even if the melting point of the high-toughness metal is considerably lower than the melting point of the high-strength metal.

Alternatively, the high-toughness metal and the high-strength metal may be disposed at the edge portions of the securing region and the remaining portion thereof, respectively, and after welding the cutting tip to the base metal at the edge area of the securing region by melting the high-toughness metal, the base metal and the cutting tip may be welded by melting the high-strength metal. This reduces the thermal stress which occurs during welding the high-strength metallic portion and cooling after the welding because the edge portions of the securing region, in which stress tends to concentrate, is welded first.

Further, the high-toughness metal and the high-strength metal may be disposed at the edge portions of the securing region and the remaining portion thereof, respectively, and the high-strength metal may be provisionally secured to the metal body or the cutting tip by melting the high-toughness metal, and then the cutting tip may be welded to the base metal. This makes it easy to supply the material of the metallic layer and also to easily and simply perform the setting of the cutting tip.

The high-toughness metal and the high-strength metal may be disposed at the edge portions of the securing region and the remaining portion thereof, respectively, and the high-strength metal and the high-toughness metal may be provisionally secured to the metal body or the cutting tip at the same time by engaging the high-toughness metal to the metal body or the cutting tip, and then the cutting tip may be welded to the base metal. This makes it easy to provide material of the metallic layer and also makes it easy and simple to perform the setting of the cutting tip.

The high-toughness metal and the high-strength metal may be disposed at the edge portions of the securing region and the remaining portion thereof, respectively, and by simultaneously melting the high-toughness metal and the high-strength metal, the cutting tip may be welded to the metal body as well as the high-strength metal portion and the high-toughness metal portion may be melted and mixed at their boundary region. This enables easy obtaining a metallic layer in which the hardness gradually changes from the high-strength metallic portion to the high-toughness metallic portion located at the edge portions of the securing region.

A high-toughness metal and a high-strength metal may be disposed at the edge portions of the securing region and the remaining portion thereof, respectively, and intermediate characteristic metals having intermediate characteristics between characteristics of the high-toughness metal and the characteristics of the high-strength metal may be disposed between the high-toughness metal and the high-strength metal, and the cutting tip may be welded to the metal body by heat-melting these metals. This enables a metallic layer in which the hardness gradually changes from the high-strength metallic portion to the high-toughness metallic portion located at the edge portions of the securing region to be easily obtained.

The high-toughness metal and the high-strength metal may be disposed at the edge portions of the securing region and the remaining portion thereof, respectively, and the high-strength metal may comprise a plurality of layers having different thermal expansion rates, and then the cutting tip may be welded to the metal body by heat-melting the high-toughness metal and the high-strength metal. This enables a high-strength metallic portion in which the thermal expansion rate gradually changes from the metal body side to the cutting tip side to be easily obtained.

A mixture of tungsten-carbine or WC powder and 6–20% cobalt or Co alloy powder may be disposed on the cutting tip, a mixture of WC powder and 40–60% Co powder may be disposed on the metal body and copper or Cu powder may be disposed on the edge portions of the securing region, and then the cutting tip may be welded to the metal body by heating these powders to sinter them. This makes it easy to obtain a high-strength metallic portion in which thermal expansion rate gradually changes from the base metal side to the cutting tip side.

Other objects and advantages of the present invention will become apparent from the description of the preferred embodiments, which may be modified in any manner without departing from the scope and spirit of the invention.

BRIEF DESCRIPTION OF THE DRAWING FIGURES

FIG. 1 shows a cutting tool according to the present invention, wherein FIG. 1A shows a front view of the cutting tool and FIG. 1B shows an enlarged partial perspective view of the cutting tool.

FIG. 2 shows an enlarged partial perspective view of a cutting tool according to an another embodiment of the present invention which corresponds to FIG. 1B.

FIG. 3 shows a manufacturing process of a cutting tool according to the present invention, wherein FIG. 3A shows an enlarged partial perspective view thereof and FIG. 3B shows a side view thereof.

FIG. 11 shows an another manufacturing process of a cutting tool according to the present invention, wherein

Figure 12A:
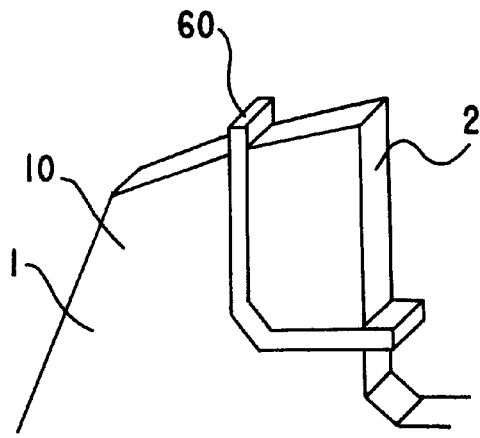
Figure 12B:
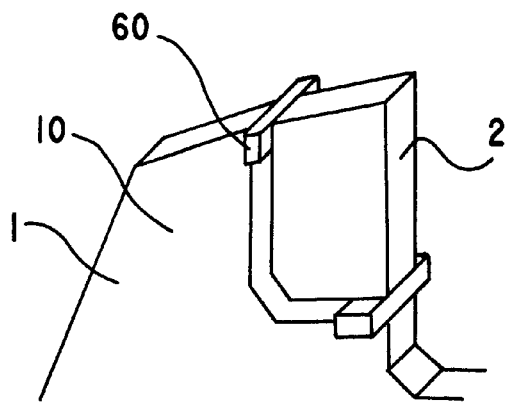
Figure 12C:
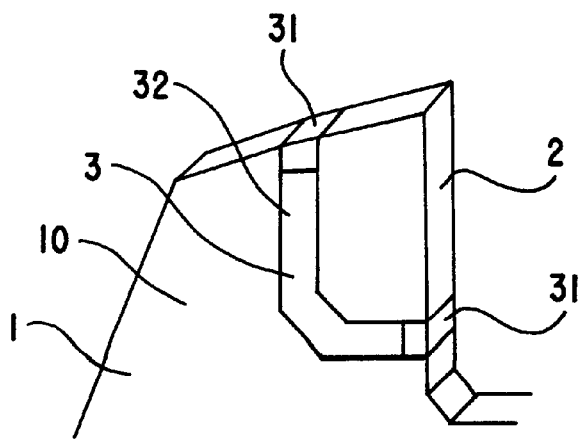
Figure 13A:
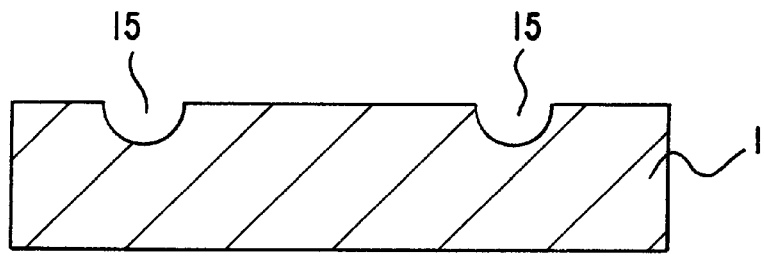
Figure 13B:
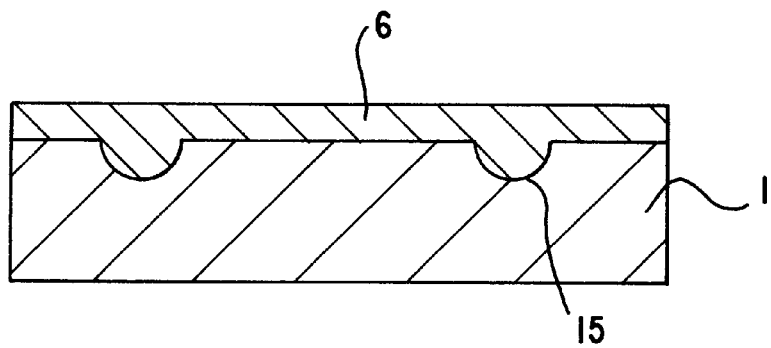
Figure 13C:
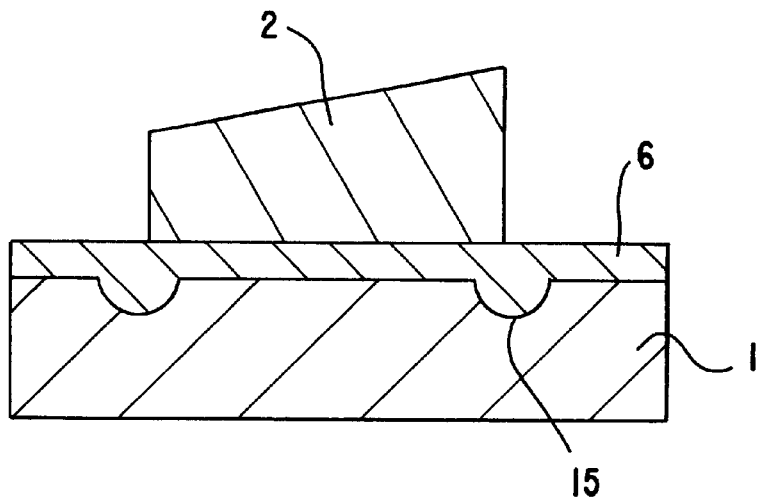
Figure 13D:
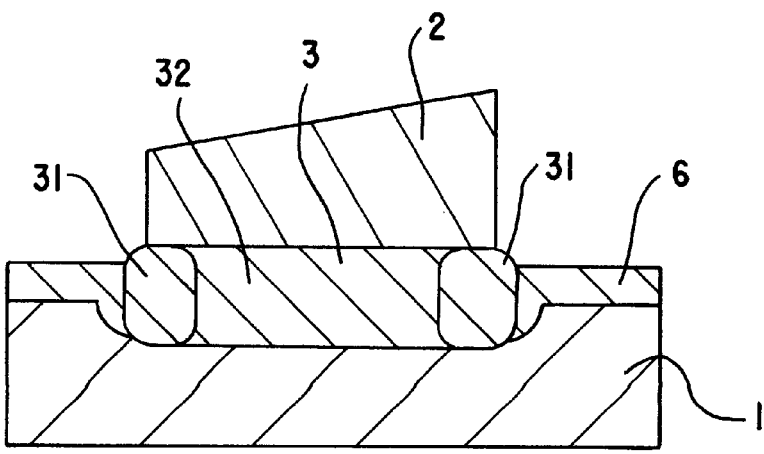

FIGS. 12A and B show still another manufacturing processes of a cutting tool of the cutting tool which is in a manufacturing process and FIG. 12C shows an enlarged partial perspective view of the cutting tool after the cutting tip is welded to the metal body.

FIG. 13 shows a different manufacturing process of a cutting tool according to the present invention, wherein FIGS. 13A to 13D show cross-sectional views of a cutting tool according to the present invention in manufacturing order.

Figure 14A:
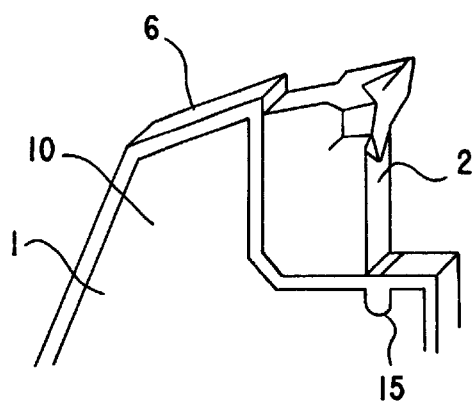
Figure 14B:
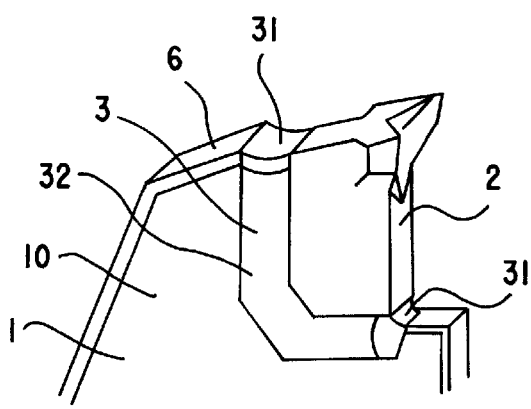

FIG. 14 shows an another enlarged partial perspective view of a cutting tool according to the present invention, wherein FIG. 14A shows an enlarged partial perspective view of the cutting tool which is in a manufacturing process and FIG. 14B shows an enlarged partial perspective view of the cutting tool after the cutting tip is welded to the metal body.

Figure 15:
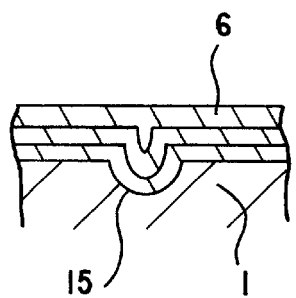

FIG. 15 shows a cross-sectional view of the dented portion of the cutting tool shown in FIG. 14 showing growing process of the nickel-plated layer.

Figure 16:
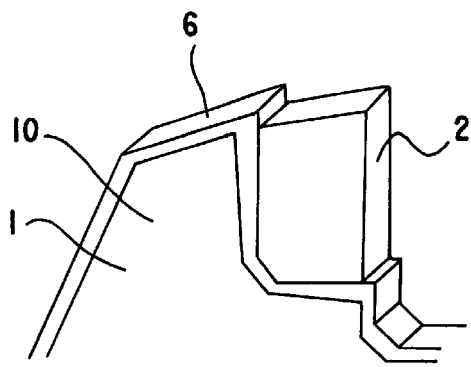

FIG. 16 shows an enlarged partial perspective view of a cutting tool according to an another embodiment of the present invention which is in a different manufacturing process.

Figure 17:
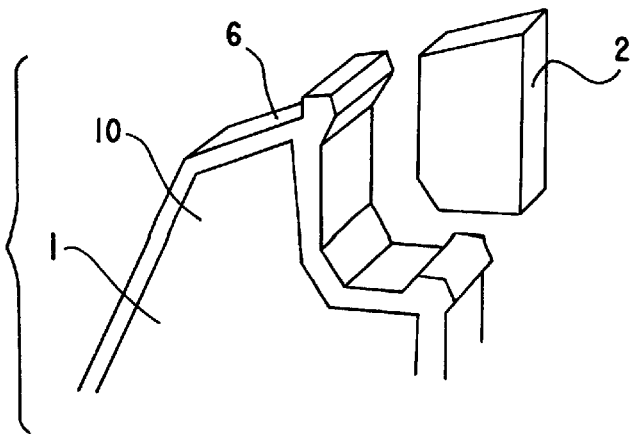

FIG. 17 shows an enlarged partial perspective view of a cutting tool shown in FIG. 16 which is in the manufacturing process.

Figure 18:
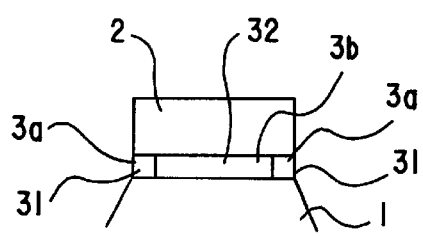

FIG. 18 shows a side view of the cutting tool according to the present invention which is in another different manufacturing process.

Figure 19A:
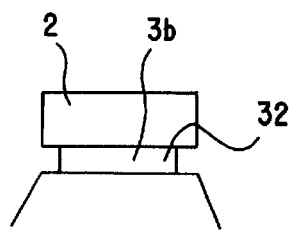
Figure 19B:
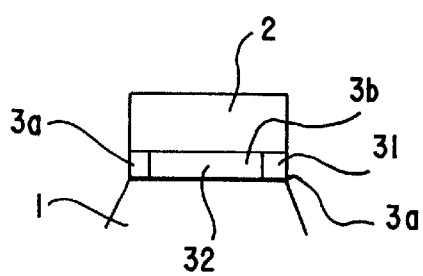

FIG. 19 shows still another different manufacturing process, wherein both FIGS. 19A and 19B show side views.

Figure 20A:
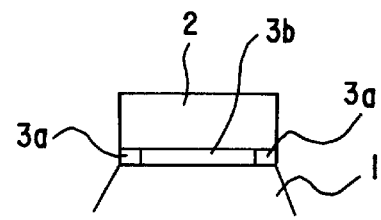
Figure 20B:
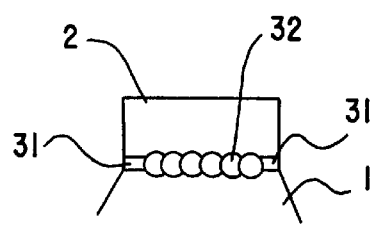

FIG. 20 shows still another different manufacturing process according to the present invention, wherein both FIGS. 20A and 20B show side views.

Figure 21A:
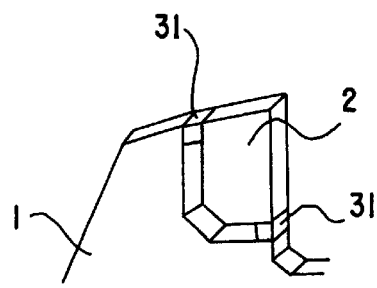
Figure 21B:
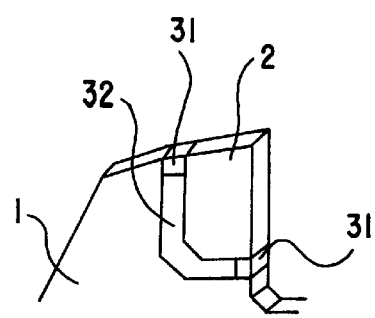

FIG. 21 shows a different manufacturing process according to the present invention, wherein both FIGS. 21A and 21B show perspective views.

Figure 22A:
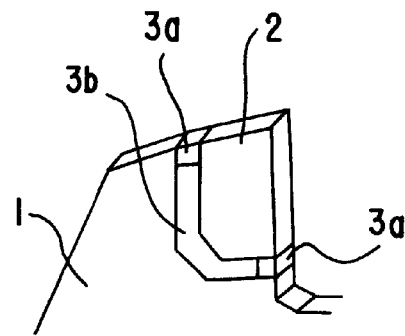
Figure 22B:
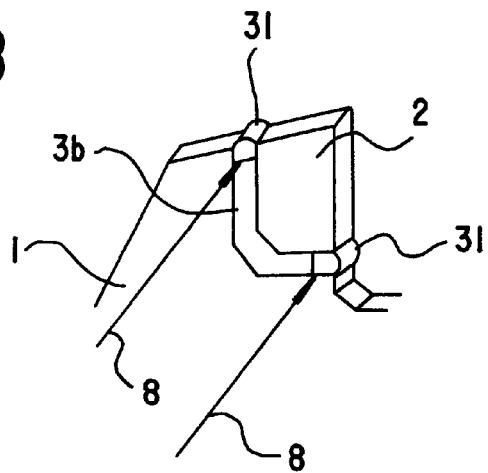
Figure 22C:
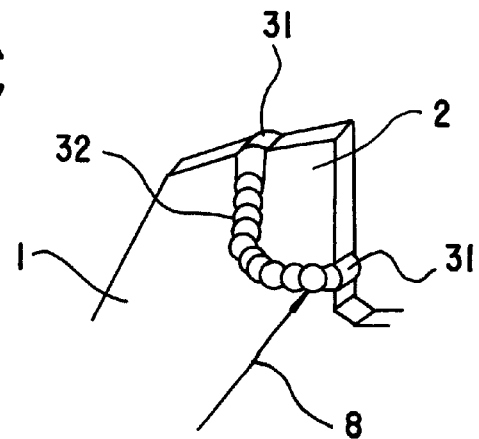

FIG. 22 shows another manufacturing process according to the present invention, wherein FIGS. 22A and 22B show an enlarged partial perspective view of the cutting tool which is in a manufacturing process and FIG. 22C shows an enlarged partial perspective view of the cutting tool after the cutting tip is welded to the metal body.

Figure 23A:
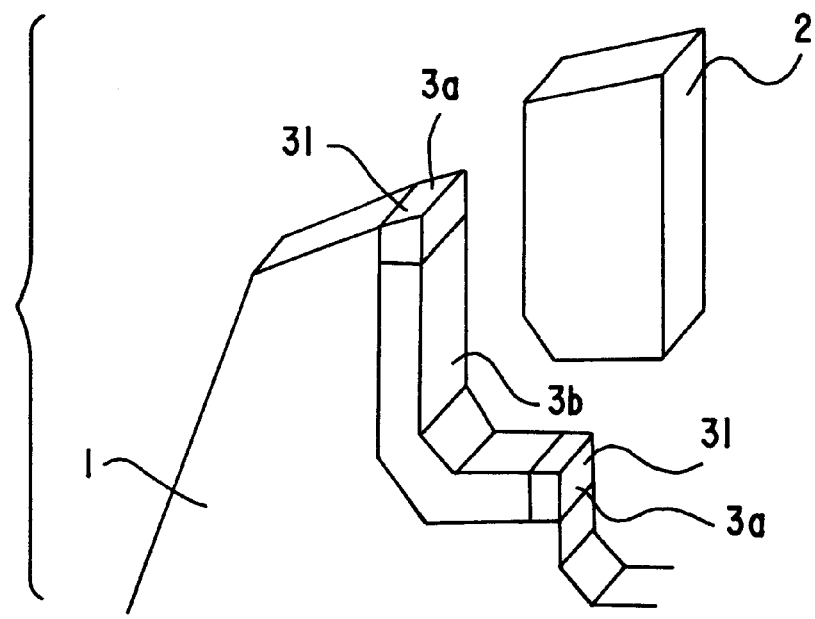
Figure 23B:
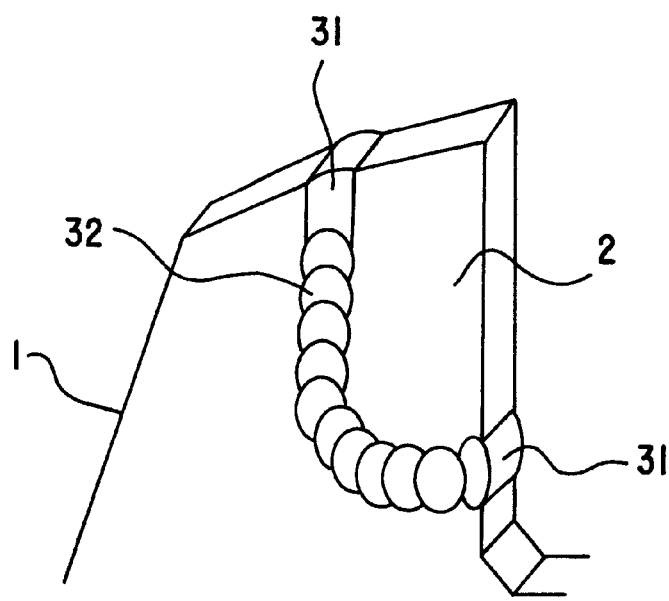

FIG. 23 shows still another manufacturing process of a cutting tool according to the present invention, wherein FIG. 23A shows an enlarged partial perspective view of the cutting tool which is in a manufacturing process and FIG. 23B shows an enlarged partial perspective view of the cutting tool after the cutting tip is welded to the metal body.

Figure 24:
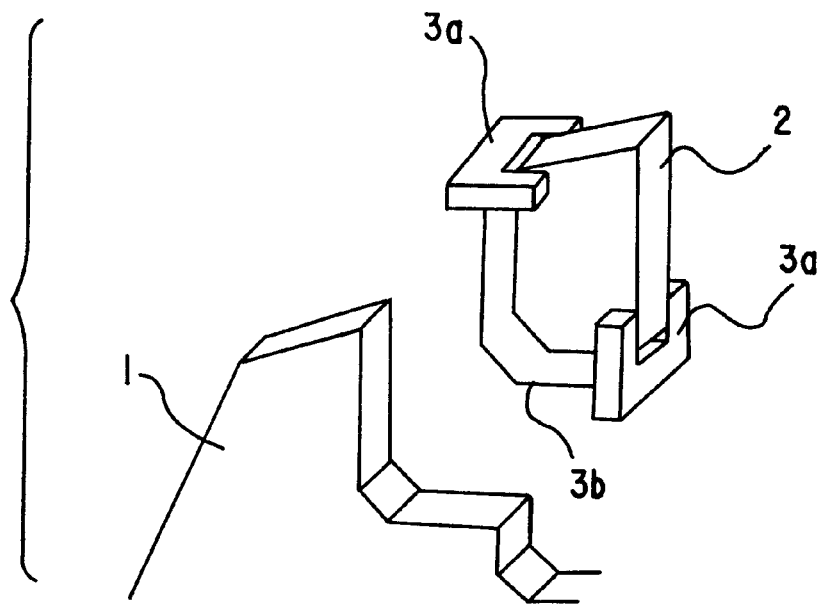

FIG. 24 shows an enlarged partial perspective view of a cutting tool according to another embodiment of the present invention which is in a manufacturing process.

Figure 25A:
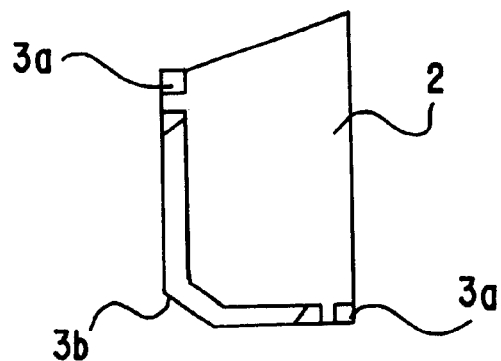
Figure 25B:
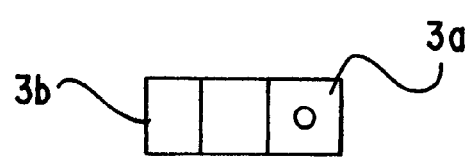

FIG. 25 shows a cutting tool according to a still another embodiment of the present invention which is in a manufacturing process, wherein FIG. 25A shows a side view thereof and FIG. 25B shows a bottom view thereof.

Figure 26A:
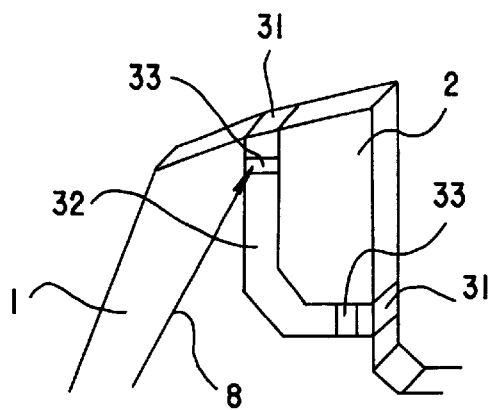
Figure 26B:
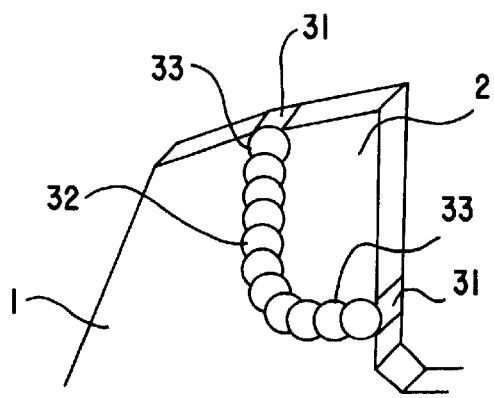

FIG. 26 shows a manufacturing process of a cutting tool according to the present invention, wherein FIG. 26A shows an enlarged partial perspective view of the cutting tool which is in a manufacturing process and FIG. 26B shows an enlarged partial perspective view of the cutting tool after the cutting tip is welded to the metal body.

Figure 27A:
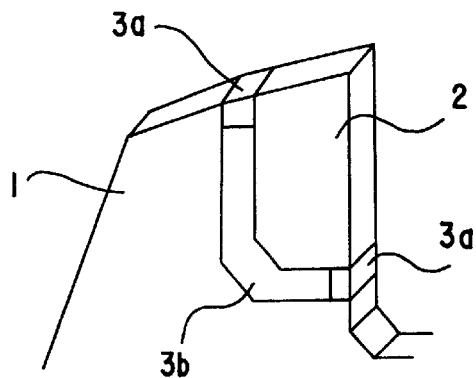
Figure 27B:
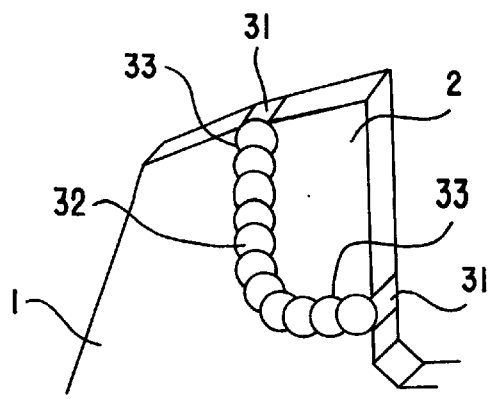

FIG. 27 shows an another manufacturing process of a cutting tool according to the present invention, wherein FIG. 27A shows an enlarged partial perspective view of the cutting tool which is in a manufacturing process and FIG. 27B shows an enlarged partial perspective view of the cutting tool after the cutting tip is welded to the metal body.

Figure 28:
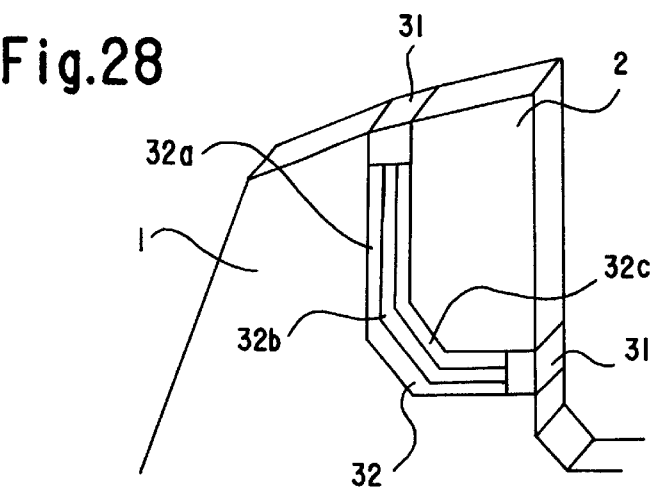

FIG. 28 shows another manufacturing process of a cutting tool according to the present invention.

Figure 29:
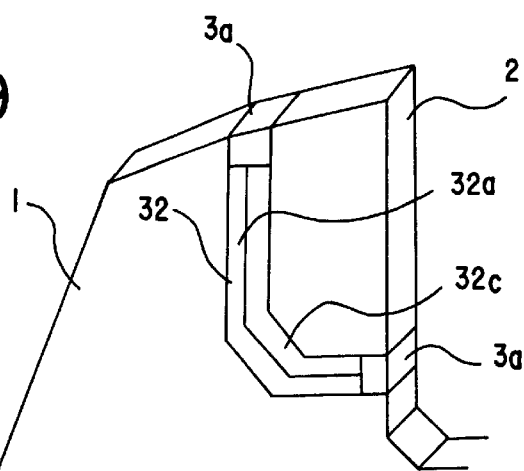
Figure 30:
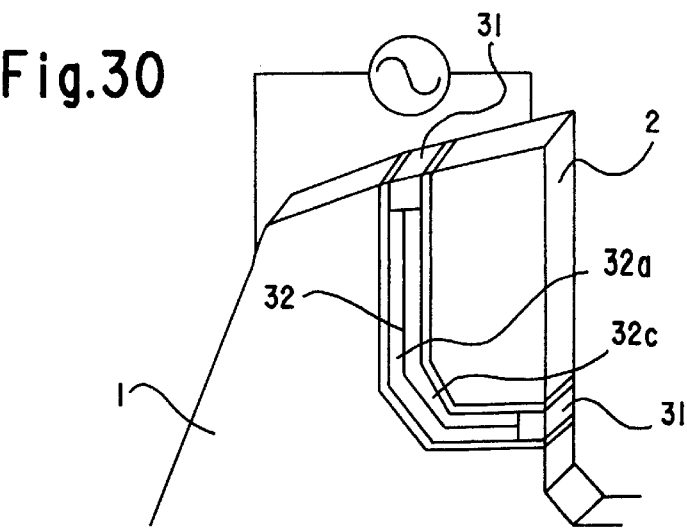

FIGS. 29 and 30 show still another manufacturing process of a cutting tool according to the present invention, wherein FIG. 29 shows a manufacturing process and FIG. 30 shows an enlarged partial perspective view of the cutting tool after the cutting tip is welded to the metal body.

Figure 31A:
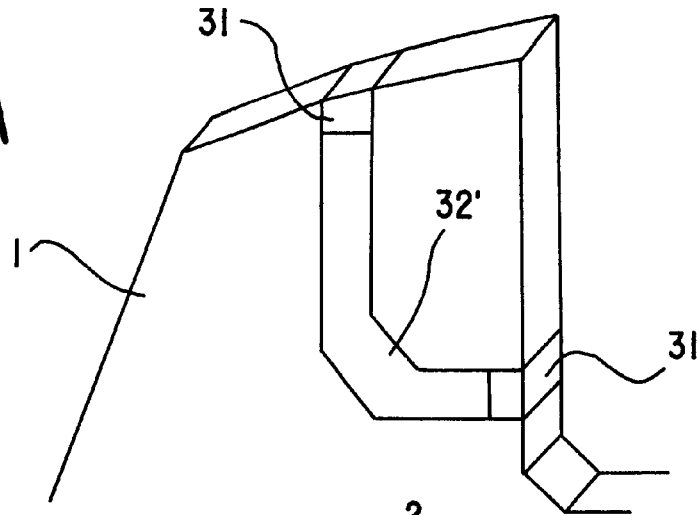
Figure 31B:
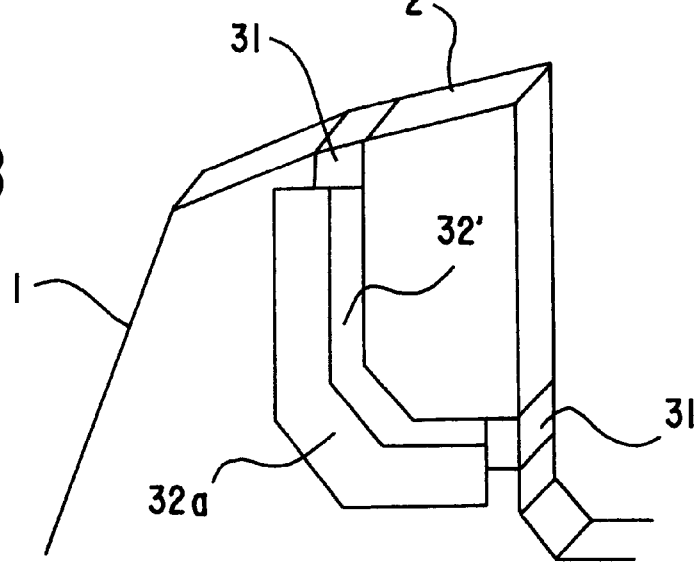
Figure 31C:
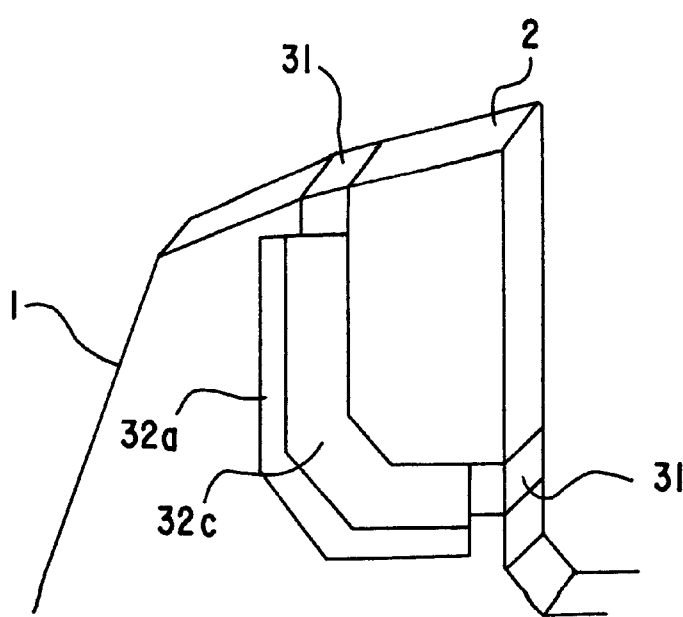

FIG. 31 shows further still another manufacturing process of a cutting tool according to the present invention, wherein FIG. 31A shows an enlarged partial perspective view of the cutting tool which is in a manufacturing process, FIG. 31B shows an enlarged partial perspective view of the cutting tool after a first welding step and FIG. 31C shows an enlarged partial perspective view of the cutting tool after a second welding step.

Figure 32A:
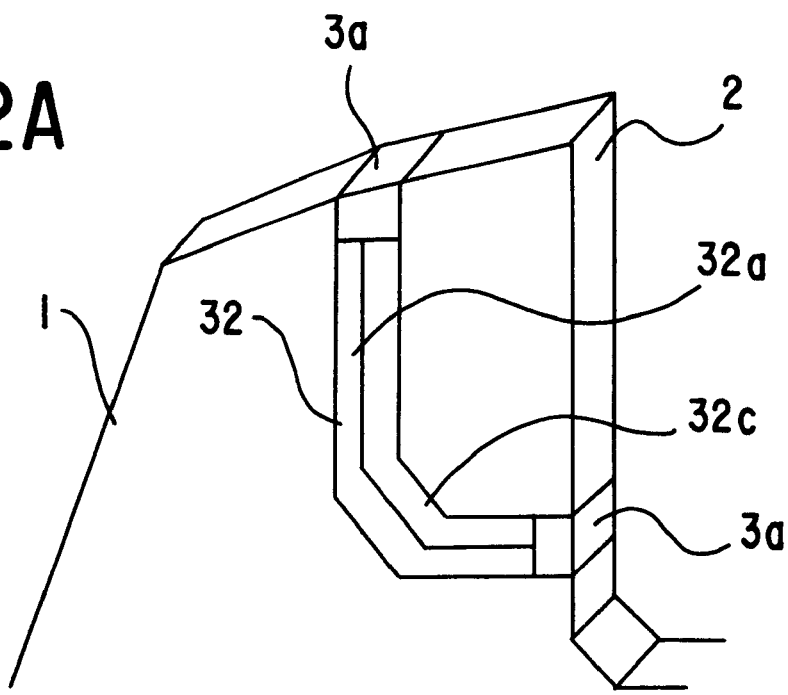
Figure 32B:
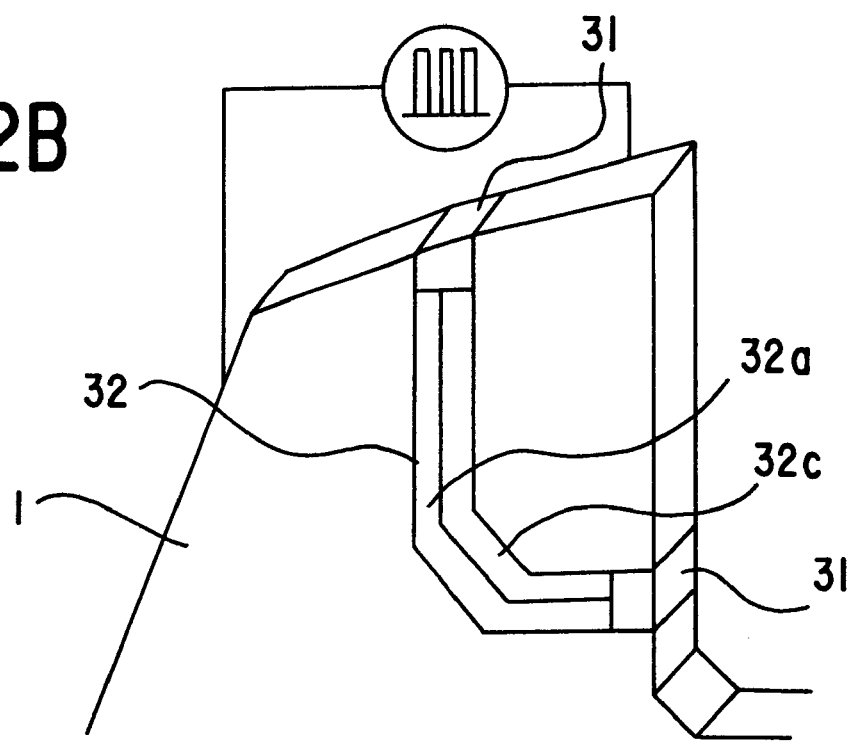

FIG. 32 shows still another manufacturing process of a cutting tool according to the present invention, wherein FIG. 32A shows an enlarged partial perspective view of the cutting tool which is in a manufacturing process and FIG. 32B shows an enlarged partial perspective view of the cutting tool after the cutting tip is welded to the metal body.

DETAILED DESCRIPTION OF THE PREFERRED EMBODIMENTS

Preferred embodiments of a cutting tool, according to the present invention, will now be described in detailed, with reference to the accompanying drawings.

FIG. 1 shows a round saw as a cutting tool of the present invention. The round saw includes a metal body 1 made of steel such as carbon steel, for example SK4, SK5, SK6 (Japanese Industrial Standard of carbon tool steel) or similar, and a cemented carbide cutting tip 2, for example, sintered alloy which is a WC-Co alloy, i.e., tungsten carbide-cobalt alloy such as SF, S1, S2, S3, G1, G2, G3, D1, D2, D3 (Japanese Industrial Standard of cemented carbide). The cutting tip 2 is secured to a cutting edge portion of a protrusion 10 which protrudes radially outwardly from a peripheral edge of the metal body 1. FIG. 1 shows a cutting tool having a cutting tip 2 of a one-side cutting edge type and FIG. 2 shows a cutting tool having a cutting tip 2 of a two- or both-side cutting edge type.

Each cutting tip 2 is secured to the metal body 1 by way of a metallic layer 3. The metallic layer 3 is not homogeneous throughout the whole portion. The layer 3 includes a high-toughness metallic portion 31 at edge portions of a securing region and a high-strength metallic portion 32 at the rest portion, wherein the high-strength metallic portion 32 has higher strength but lower toughness than the high-toughness metallic portions 31. The high-strength metallic portion 32 has an intermediate thermal expansion rate between the thermal expansion rate of the metal body 1 and that of the cutting tip 2. In this specification, the wordings of 'high-toughness' and 'high-strength' are relative expressions when both the metallic portions 31, 32 are compared. Therefore, the expressions "high-toughness" and "high-strength" do not mean absolute or specific values.

The high-toughness metallic portion 31 and the high-strength metallic portion 32 may include one common element, both the portions 31, 32 can be firmly secured to each other, resulting in small defectiveness.

Where both the metallic portions 31, 32 include a different main element, an alloy comprising Fe-Ni as a main element and formed by melting steel (SK5) and nickel can be preferably used to form the metallic portion 3. In this case, nickel amounts result in high-toughness and high-strength, and thus a small amount of nickel is included in the high-strength metallic portion 32 and a large amount of nickel is included in the high-toughness metallic portion 31. For example, Fe-Ni of 30–60%-C of 0.1–0.5% alloy is used as the high-toughness metallic portion 31 and Fe-Ni of 20–30%-C of 0.4–0.6% alloy is used as the high-strength metallic portion 32. Both alloys may include cobalt or Co which is a cemented carbide alloy element.

The high-strength metallic portion 32, including a small amount of nickel, does not plastically deform easily because of its excellent proof stress, while the high-toughness metallic portion 31, including large amount of nickel, plastically deform easily because of its poor proof stress. Therefore, the cutting tool is excellent in proof stress throughout the securing region and does not plastically deform easily because a large portion, except for edge portions of the securing region, is the high-strength metallic portion 32, thereby satisfactorily functioning as a cutting tool. If edge portions of the securing region, which is easily cracked due to the concentration of thermal residual stress caused during the welding process and stress caused by load, are also high-strength metallic portions 32 including a small amount of nickel, cracks tend to generate because of the low toughness of the high-strength metallic portions 32. However, in the cutting tool according to the present invention, because the edge portions of the securing region are high-toughness metallic portions 31 including a large amount of nickel and thus excellent in toughness, cracks are not generated.

Because the thermal expansion rate of the high-strength metallic portion 32 of the metallic layer 3 falls between the thermal expansion rate of the cutting tip 2 and that of the metal body 1, the thermal expansion rate of the cutting tip 2 being larger than the thermal expansion rate of the metal body 1, thermal stress caused during the welding process for securing the cutting tip 2 to the base 1 and cooling after the welding process decreases, thereby preventing the generation of cracks due to the thermal stress and detaching the cutting tip 2.

In a Fe-Ni alloy, the larger the amount of nickel becomes, the less the toughness becomes, and the less the amount of nickel in the Fe-Ni alloy, the higher the hardness becomes, resulting in hard plastic deformation, while the thermal expansion rate becomes minimum when the amount of nickel is about 30%. Therefore, in forming the metallic layer 3, especially the high-strength metallic portion 32, from a Fe-Ni alloy, it should be noted that it is not necessarily enough to simply reduce the amount of nickel in order to raise the hardness.

Figure 4:
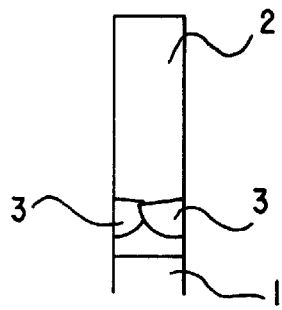
FIG. 4 shows a side view of the cutting tool after the cutting tip is welded to the metal body.

The above-mentioned cutting tool with the cutting tip 2 secured to the metal body 1 by way of the metallic layer 3, including the metallic portions 31, 32 differing in amount of nickel, can be obtained by welding the cutting tip 2 to the metal body 1 as follows. As shown in FIG. 3, a bevel end portion is formed on a securing surface of the metal body 1 for securing the cutting tip 2, and the cutting tip 2 is disposed on the bevel end portion. Then, melting metals 5 are heated together with the bevel end portion of the metal body 1 so as to melt both the melting metals 5 and the bevel end portion by applying a laser beam 8. As a result, the cutting tip 2 is welded to the base of the metal body 1 such that a mixed alloy of the melting metal 5 and the bevel end portion of the base of the metal body 1 forms a metallic layer 3 as shown in FIG. 4. As the melting metal 5, a metal containing a large amount of nickel, for example, a pure nickel, is used at edge portions of the securing region and a metal containing a lesser amount of nickel, for example Fe-Ni of 40–50% alloy, is used at the remaining portion. Because the amount of nickel is adjusted by using different kinds of melting metals during the welding process which are different in the amount of nickel, metallic portions 31, 32, which are different in strength and toughness, can be easily formed since the amount of nickel is different at both the edge portions of the securing region and the remaining portion thereof though both the portions are of the same kind of metal.

Figure 5:
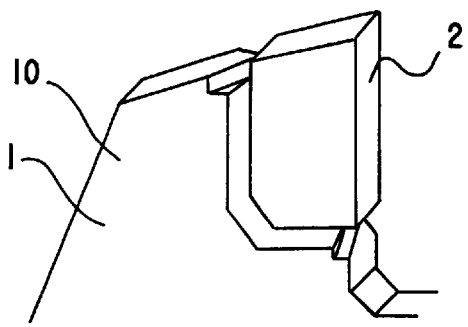
FIG. 5 shows an enlarged partial perspective view of a cutting tool according to an another embodiment of the present invention which is in a manufacturing process.

As shown in FIG. 5, bevel end portions to be formed on the base of the metal body 1 may be formed such that bevel angles at both end portions, located at edge portions of the securing region, are larger than that at the remaining portion. In this case, simply applying a single melting metal 5 comprising nickel or nickel alloy makes it possible to form metallic portions 31, 32 which are different in the amount of nickel, i.e., different in strength and toughness, wherein each of the metallic portions 31, 32 are located at the edge portions of the securing region and the remaining portion, respectively, because the amount of nickel becomes larger at the edge portions.

Figure 6:
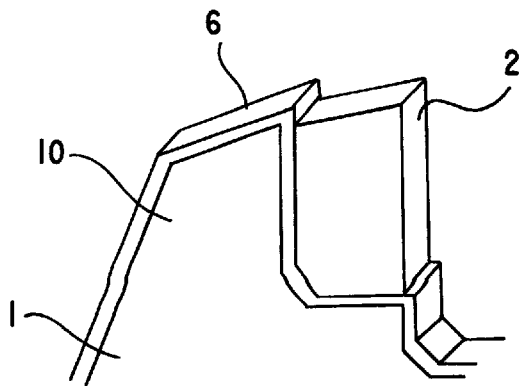
FIG. 6 shows an enlarged partial perspective view of a cutting tool according to a still another embodiment of the present invention which is in a manufacturing process.
Figure 7:
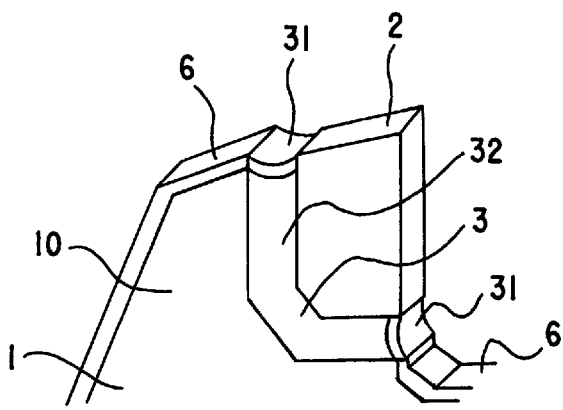
FIG. 7 shows an enlarged partial perspective view of the cutting tool shown in FIG. 6 after the cutting tip is welded to the metal body.

As shown in FIG. 6, a nickel-plated layer 6 having a thickness of, for example, 100–300 μm, may be formed on a cutting tip securing surface of the metal body 1 and its adjacent surface which continues the cutting tip securing surface in the form of a corner. Then, the cutting tip 2 is disposed on the securing surface and both the metal body 1 and nickel alloy 6 may be melted to form a metallic layer 3 by applying a laser beam. As a result, the cutting tip 1 is welded to the metal body 1. At the edge portions of the securing region, nickel contained in the nickel layer 6 located at the corner and its adjacent portion in the form of a corner forms high-toughness metallic portions 31 including large a amount of nickel, as shown in FIG. 7. In this case, it is not required to adjust the amount of nickel so as to differentiate the amount of nickel between the edge portions of the securing region and the remaining portion.

Further, simply heat-melting the base metal and the nickel layer by applying a laser beam forms the high-toughness metallic portions 31 including a large amount of nickel at the edge portions of the securing region as compared to the remaining portion. Thus, this makes it easier to manufacture the cutting tool. The heat-melting may be performed by utilizing not only a laser beam but also an electron beam, a plasma beam, an arc beam, and similar.

The thickness of the nickel layer 6 is determined according to the width of the melting portion such that the components of the metallic layer 3 (metallic portions 31, 32) formed as a welding portion become as above-mentioned. Where a width of the melting portion is, for example, 1 mm, if the thickness of the nickel layer 6, made by plating, is set to be 250 $\mu$m, then the components of the melting portion become approximately Fe-25%Ni-0.6%C. The nickel layer 6 may be formed by spraying. In this case, the thickness of the nickel layer 6 is preferred to be approximately 400–700 $\mu$m, and approximately two thirds of the welded bead width.

Figure 8:
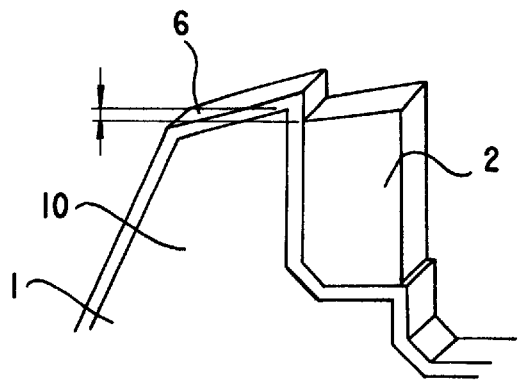
FIG. 8 shows an enlarged partial perspective view of a cutting tool having a metal body of an inappropriate configuration.
Figure 9:
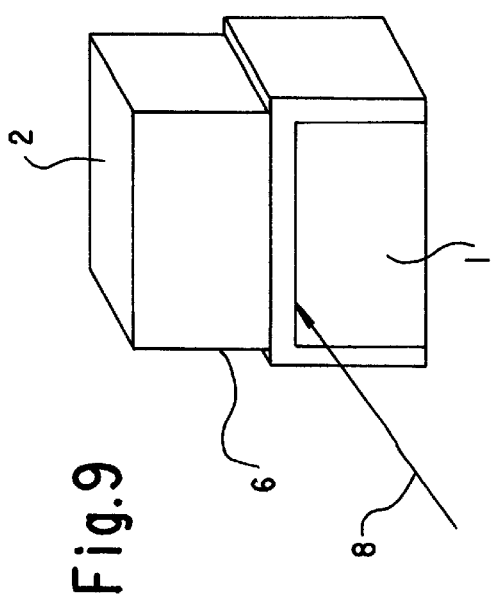
FIG. 9 shows a perspective view of a cutting tool according to another embodiment of the present invention which is in a manufacturing process.
Figure 10:
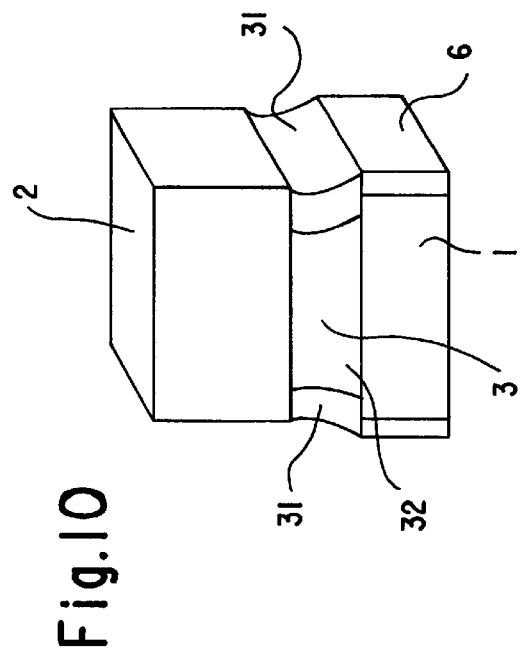
FIG. 10 show a perspective view of the cutting tool shown in FIG. 9 after the cutting tip is welded to the metal body.

If the edge surfaces of the metal body 1 protrude from the corresponding edge surfaces of the cutting tip 2, as shown in FIG. 8, in order to enrich the amount of nickel in the high-toughness metallic portion 31 at the edge portions of the securing region by utilizing the nickel layer 6 which is coated on the corner portion located at the edge portions of the securing region, it is impossible to form high-toughness metallic portions including a large amount of nickel at the edge portion of the securing region. Therefore, the corners of the metal body 1 should be located at approximately the same level as the edge of the cutting tip 2, or the corners should not protrude from the edge surfaces of the cutting tip 2. The above-described embodiments are directed to a round saw, however, the present invention is not limited thereto, but can also be applied to such cutting tools as shown in FIGS. 9 and 10.

Figure 11A:
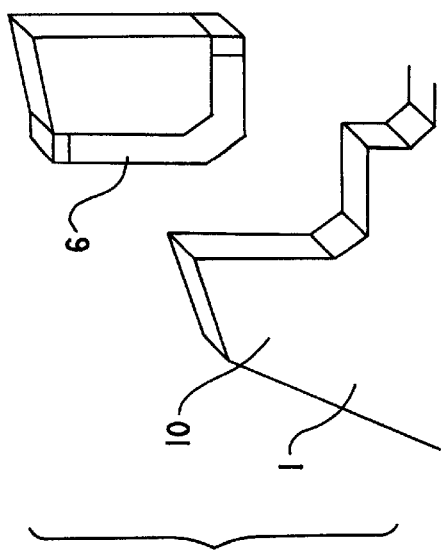
FIG. 11A shows an enlarged partial perspective view of the cutting tool which is in a manufacturing process and FIG. 11B shows an enlarged partial perspective view of the cutting tool after the cutting tip is welded to the metal body.
Figure 11B:
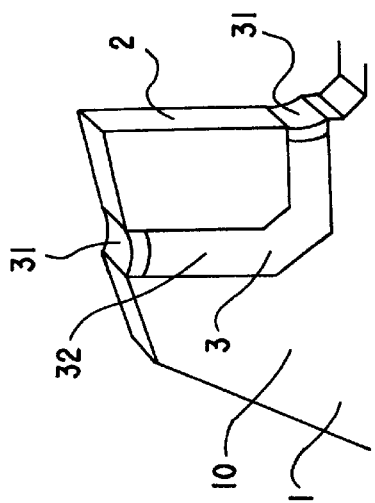

If the nickel layer 6 is formed by spraying, the layer 6 may be formed on the cutting tip 2 as shown in FIG. 11. In this case, if an amount of nickel in the nickel layer 6 formed at a portion to be an edge portion of the securing region is set to be larger than the amount of nickel in the remaining portion, securing the cutting tip 2 to the metal body 1 by applying a laser beam to heat-melt enables the formation of the metallic portions 31, 32 which are different in the amount of nickel they contain therein. Forming such a nickel layer 6, i.e., a nickel layer which has a large amount of nickel at the edge portions of the securing region, can also be performed by providing the nickel layer 6 at the side on which the metal body 1 is located.

In place of forming the nickel layer 6, as shown in FIG. 12, a thin plate 60, comprising nickel or nickel alloy, may be disposed between the cutting tip 2 and the metal body 1. The thin plate 60 and the metal body 1 are heated so as to melt them such that the cutting tip. 1 is welded to the metal body 2. In this case, by using a thin plate 60 having both ends protruding from the edge portion of the securing region in the direction of the length thereof as shown in FIG. 12A or in the direction of the width thereof as shown in FIG. 12B, high-toughness metallic portions 31 including a large amount of nickel can be formed at the edge portions of the securing region. The thickness of the thin plate 60 is preferably 0.05–0.4 mm and the protruding length thereof is preferably about 0.1–0.5 mm, but the present invention is not limited to those particular thicknesses and lengths.

Differentiating an amount of nickel in the metallic layer 3 between the edge portions of the securing region and the rest portion thereof may be performed by changing thickness of the nickel layer 6 or the thin plate 60. As shown in FIGS. 13 and 14, if dented portions 15 (for example, having 0.1–2 mm thick, 0.2–2 mm width) are formed at the edge portions of the securing region of the base of the metal body 1, then nickel layers 6 are formed thereon by plating. As shown in FIG. 15, the dented portions 15 are buried by the layer 6 and thus the layer 6 becomes thick at the portions 15. Therefore, when the cutting tip 2 is melt-welded to the metal body 1, high-toughness metallic portions 31, which include a large amount of nickel, are formed at the edge portions of the securing region.

As shown in FIG. 16, the thickness of the nickel layer 6 may be set such that the thickness thereof gradually decreases from the edge portions of the securing region toward the middle portion thereof. The above-mentioned nickel layer 6 may be obtained by forming a nickel layer 6 which is thicker than a required thickness by means of plating, spraying or similar, as shown in FIG. 17, and then by shaving, cutting or similar, so that clearance between the cutting tip 2 and the metal body 1 is smaller than a certain amount and the thickness of the edge portions of the securing region is thicker than the remaining portion.

When the high-strength metallic portion 32 and the high-toughness metallic portion 31 of the metallic layer 3 are formed of the same type of metal including a common element, Fe-Ni alloy (including simple Ni), a kovar alloy (Fe-29%Ni-17%Co) or Fe-Ni-Co alloy including a larger amount of Ni than the kovar alloy may be used. However, the present invention is not limited to the above listed compositions. A metal which changes strength and toughness depending on composition ratio may be used. If the length of the high-toughness metallic portion 31 to be formed at the edge portions of the securing region is set to be about 0.1–0.5 mm in the direction of the securing region, stress concentration can be reduced, but the length is not limited to those dimensions.

If the high-strength metallic portion 32 and the high-toughness metallic portion 31 in the metallic layer 3 are formed by different kinds of metal which are different in a main element, the selection of materials of each metallic portions 31, 32 can be easily performed to enhance the strength of the high-strength metallic portion 31 and the toughness of the high-toughness metallic portion 32, as compared to metallic portions 31, 31 formed by the same type of metal which includes a common element. For example, the high-strength metallic portion 32 is formed by a kovar alloy (Fe-29%Ni-17%Co alloy), Ti, W, Mo, Fe-42%Ni alloy, or similar, and the high-toughness metallic portion 31 is formed by Cu, Ag, Ag-Cu alloy, Al, Au, Pb, Pb-Sn, or similar. Because the high-toughness metallic portion 31 can be formed by very soft metal, the toughness at the edge portions of the securing region can be highly enhanced. In this case, the length of the high-toughness metallic portion 31 is set to be about 0.1–1.0 mm.

Where the cutting tip 2 is secured to the base of the metal body 1 by way of a metallic layer 3 including metallic portions 31, 32 which are different in a main element, a bevel end portion is formed on a securing surface of the metal body 1 for securing the cutting tip 2 and the cutting tip 2 is disposed on the bevel end portion, as shown in FIG. 3. Then, melting metals 5 are heated to their melting point by applying a laser beam 8 to supply different melting metals 5 to the edge portions of the securing region and the rest portion. As a result, the cutting tip 2 is welded to the base of the metal body 1 such that the metallic portions are formed. In this case, the high-strength metallic portion 32 should be formed first and then the high-toughness metallic portion 31 should be formed. Further, a part of the base of the metal body 1 or the cutting tip 2 may be melted. Especially, when a material including Fe such as the metallic portion 31 or 32 is used, a portion of the base of the metal body 1 to which the metallic portion 3 is to be faced may positively be melted such that the portion of the base of the metal body 1 is mixed with the melted melting metal 5 to form an alloy.

As shown in FIG. 18, the cutting tip 2 may be welded to the base of the metal body 1 by applying a laser beam so as to melt materials 3a, 3b comprising the high-toughness metallic portion 31 and the high-strength metallic portion 32, respectively, which are disposed between the cutting tip 2 and the base of the metal body 1. In this case, where the melting point of the material 3a is considerably lower than the melting point of the material 3b, such as is the case when titanium or Ti and copper or Cu are used as the material 3b of the high-strength metallic portion 32 and the material 3a of the high-toughness metallic portion 31, respectively, applying the laser beam may be directed only to the material 3b so as to melt the material 3a of a low melting point by the remaining heat of the material 3b generated when the laser beam is applied. This enables the welding to take place without causing scatter of the material 3a of low melting point due to sudden boiling without the necessity of controlling the heat-input condition such as changing the applying condition of the laser beam toward the materials 3a, 3b.

In such a case that a material 3a having a much lower melting point as the material of the high-toughness metallic portion 31, for example Ag-Cu wax, Pb-Sn solder or similar, is used, as shown in FIG. 19, only a material 3b as the high-strength metallic portion 32, for example a Fe-Ni alloy, may be disposed between the base of the metal body 1 and the cutting tip 2. Immediately after welding the cutting tip 2 by heat-melting the material 3b, the material 3a may be supplied to be melt by the remaining heat of the material 3b.

In such a case that Ni is used as the high boiling point material 3b and Cu is used as the low boiling point material 3a, each material 3a, 3b may be disposed between the base of the metal body 1 and the cutting tip 2, as shown in FIG. 20A. Then, the contact portion between the material 3b and the base of the metal body 1 may be positively melted by applying a laser beam thereto, as shown in FIG. 20, so that the base of the metal body 1 and the material 3b is mixed to form an alloy and the material 3a is melted by the remaining heat.

As shown in FIGS. 21 and 22, the cutting tip 2 may be welded to the base of the metal body 1 by applying a laser beam, etc. to the high-toughness metallic portions 31 and thereafter may be welded so as to form a high-strength metallic portion 32. This reduces the thermal stress which occurs during welding the cutting tip 2 at the high-strength metallic portion 32 and cooling after the welding because the edge portions of the securing region in which stress tends to be concentrated is welded first.

In such a case that the cutting tip 2 is welded to the metal body 1 by melting the materials 3a, 3b disposed between the cutting tip 2 and the metal body 1, the materials 3a, 3b may be provisionally secured to the base of the metal body 1 by heat-melting the material 3a and then the cutting tip 2 may be welded to the base of the metal body 1, as shown in FIG. 23. This enables easy supplying of the materials 3a, 3b and stable setting of the cutting tip 2. Alternatively, the materials 3a, 3b may be secured not to the base of the metal body 1, but instead to the cutting tip 2 by melting the material 3a. Provisionally securing the materials 3a, 3b may be performed by bending the material 3a as shown in FIGS. 24 and 25 or by press-fitting or engaging a dented portion to a protruded portion between the cutting tip 2 and the material 3a.

The metallic layer 3 of the high-toughness metallic portion 31 and the high-strength metallic portion 32 may be formed by many kinds of metals instead of two kinds of metals. In this case, as shown in FIG. 26, a metallic portion 33 having intermediate characteristics (hardness) may preferably be disposed at a boundary region between the high-strength metallic portion 32 and the high-toughness metallic portion 31. In such a case that the high-toughness metallic portion 31 is formed by Ni and the high-strength metallic portion 32 is formed by a kovar alloy (Fe-29%Ni-17%Co alloy), the metallic portion 33 is formed by Fe-Ni alloy, preferably Fe-Ni alloy including a large amount of nickel. Further, the high-toughness metallic portion 31 is formed by Cu and the high-strength metallic portion 32 is formed by Ti, the metallic portion 33 is formed by Ag-Cu alloy. Furthermore, in such a case that the high-toughness metallic portion 31 is formed by Fe-Ni of 80–90% alloy and the high-strength metallic portion 32 is formed by Fe-42%Ni alloy, the metallic portion 33 is formed by Fe-Ni of 42–80% alloy. Sudden changes of hardness or thermal expansion rate at the boundary region between the high-strength metallic portion 32 and the high-toughness metallic portion 31 can be removed by interposing the metallic portion 33. Thus, stress concentration occurring at the boundary region can be prevented, thereby enhancing securing strength and securing liability.

In such a case that a metallic portion 33 which gradually varies in hardness from the high-strength metallic portion 32 to the high-toughness metallic portion 31 is formed, special materials are not required because, as shown in FIG. 27, in such a case that Ni is used as the material 3a of the high-toughness metallic portion 31 and Fe-42%Ni alloy is used as the material 3b of the high-strength metallic portion 32, the metallic portion 33 having an intermediate characteristic can be formed between the metallic portions 31, 32 by heating the boundary region of both the materials 3a, 3b to melt and mix the materials 3a, 3b.

As for the high-strength metallic portion 32 of the metallic layer 3, the high-strength metallic portion 32 may be formed by a plurality of layers. In this case, the thermal expansion rate of the high-strength metallic portion 32 can be gradually changed, i.e., decreased, from the base of the metal body 1 to the cutting tip 2. As a result, the thermal expansion rate difference between the base of the metal body 1 and the high-strength metallic portion 32 at the boundary region therebetween can be reduced and at the same time the thermal expansion rate difference between the cutting tip 2 and the high-strength metallic portion 32 at the boundary region therebetween can be reduced. Because large differences in thermal expansion rate can be prevented from occurring, thermal stress which generates during the welding process or the cooling process after welding can be reduced, thereby enhancing securing strength and securing liability.

The high-strength metallic portion 32 may be made of three layers as shown in FIG. 28 or two layers as shown in FIGS. 29 and 30. In the case of three layers, the layer 32*a* adjacent to the base of the metal body 1 may be Fe-Ni of 10–25% alloy (thermal expansion rate: $10-15 \times 10^{-6}$), the layer 32*c* adjacent to the cutting tip 2 may be formed by Fe-Ni of 25–30% alloy (thermal expansion rate: $6-10 \times 10^{-6}$) and the intermediate layer may be formed by Fe-Ni of 22–27% alloy (thermal expansion rate: $8-12 \times 10^{-6}$). Furthermore, as shown in FIGS. 29 and 30, in the case of two layer, the layer 32*a* adjacent to the base of the metal body 1 may be made of Fe-Ni of 40–45% alloy (thermal expansion rate: $7-10 \times 10^{-6}$), the layer 32*c* adjacent to the cutting tip 2 may be made of Fe-Ni of 38–40% (thermal expansion rate: $5-8 \times 10^{-6}$). In any event, in such a case that the high-strength metallic portion 32 is made of a plurality of layers, heat-melting is preferably performed by resistance welding instead of applying a laser beam or similar. Because only each interface contacting each other is melted, the inclined characteristic of the thermal expansion rate can be maintained despite the mixture of the layers.

In the embodiment shown in FIG. 31, a pure nickel material 32' having a thickness of 0.45 mm is disposed between the base of the metal body 1 and the cutting tip 2, and total 1.0 mm thickness or 0.2 mm thickness of the material 32' on the side of the base of the metal body 1 and 0.8 mm thickness of the base of the metal body 1 is heat-melted so as to mix them by applying a laser beam or arc thereto to form a layer 32*a* of Fe-20% Ni alloy. Then, total 1 mm thickness of the rest of the 0.25 mm thickness of the material 32' and 0.75 mm thickness of the layer 32*a* on the side of the material 32' is heated so as to melt and mix them by applying a laser beam or arc thereto to form a layer 32*c* of Fe-40% Ni alloy. The cutting tip 2 is welded to the metallic layer 3 by slightly melting the interface portion between the cutting tip 2 and the layer 32*c*. As a result, though only the single material 32' is used, the high-strength metallic portion 32 having an increasing rate of thermal expansion can be obtained. Welding the high-toughness metallic portion 31 may be performed before welding the above-mentioned first welding of the high-strength metallic portion 32, or may be performed at the same time of the first or second welding, or may be performed after the second welding.

In the embodiment shown in FIG. 32, a layer 32*c* in which 6–20% of Co powder is mixed into WC powder is disposed on the side of the cutting tip 2 and a layer 32*a* in which 40–60% of Co powder is mixed into WC powder is disposed on the side of the metal body 1, and materials 3*a* each comprising Cu powder are disposed on the edge portions of the securing region. Then, the powders are sintered to weld the cutting tip 2 to the metal body 1 by passing a pulse between the metal body 1 and the cutting tip 2. In this case, changing only the mixing ratio of the powders can make layers having the required thermal expansion rate. Sintering a mixture of WC powder and 6–20% Co powder can produce a layer of $6-8 \times 10^{-6}$ thermal expansion rate, and sintering a mixture of WC powder and 40–60% Co powder can produce a layer of $8-12 \times 10^{-6}$ thermal expansion rate. Heating for sintering may be performed by applying a laser beam, an electric beam, a plasma beam, an arc, or similar, instead of passing a pulse.

Several methods mentioned above may be combined.

As mentioned above, according to the present invention, a cutting tool includes a steel metal body and a cemented carbide cutting tip secured to the metal body by way of a metallic layer. The metallic layer has a high-strength metallic portion and a high-toughness metallic portion. The high-strength metallic portion is made of a metal having a thermal expansion rate between a thermal expansion rate of the metal body and a thermal expansion rate of the cutting tip. The high-toughness metallic portion is located between edge portions of a securing region of the metal body and the cutting tip and has toughness larger than the toughness of the high-strength metallic portion. The cutting tool according to the present invention can decrease the possibility of cracks occurring at the edge portions of the securing region by selecting a thermal expansion rate of the metallic layer so as to decrease thermal stress caused during the cooling process after welding, and further by positioning a high-toughness metallic layer at the edge portions of the securing region where stress is concentrated and by positioning a high-strength metallic layer which meets the strength requirement at the rest of the securing region.

In this case, if the high-strength metallic portion and the high-toughness metallic portion include at least one common element, excellent securing strength between the high-strength metallic portion and the high-toughness metallic portion can be obtained. Defects can thereby be decreased, and especially, if the high-strength metallic portion is made of an alloy including Fe-Ni as a main element and the high-toughness metallic portion is made of an alloy including a larger amount of Ni than in the high-metallic portion, preferable results can be obtained because the boundary region between the metal body and the metallic layer is made of an alloy which is a mixture thereof.

In such a case that the high-strength metallic portion and the high-toughness metallic portion in the metallic layer include different main elements, stress concentration can be effectively reduced because the appropriate material can be used in the high-strength metallic portion and the high-toughness metallic portion. More specifically, very soft metal can be used in the high-toughness metallic portion.

Furthermore, adapting a metallic layer which gradually varies in hardness from the high-strength metallic portion to the high-toughness metallic portion located at the edge portions of the securing region can avoid stress concentration at a boundary region between the high-strength metallic portion and the high-toughness metallic portion which causes cracking due to employing metallic layers comprising a plurality of different kinds of metallic portions, and therefore can obtain preferable results.

Adapting a high-strength metallic portion which gradually varies in thermal expansion rate from the side of the metal body to the side of the cutting tip can further decrease thermal stress which occurs when cooling after the securing process, thereby enhancing securing strength and securing liability.

A method for making a cutting tool according to the present invention includes the steps of forming a metallic layer between a steel metal body and a cemented carbide cutting tip such that the metallic layer is different in strength and toughness between edge portions of a securing region of the metal body and the cutting tip and the rest portion, and welding the cutting tip to the metal body by way of the metallic layer. Therefore, the strength and toughness of the metallic layer can be easily adjusted because such adjustments can be done when welding.

When the metallic layer is made of a metal comprising Fe-Ni as a main ingredient and the amount of Ni at edge portions of the securing region between the metal body and the cutting tip is larger than the amount of Ni at the rest of the securing region, altering the amount of Ni in the edge portions of the securing region and the rest portion thereof, i.e., altering the strength and the toughness therebetween, can easily be performed, thereby enabling easy production of the cutting tool mentioned above.

If a bevel end portion is formed on at least one of the securing surfaces of the metal body and the cutting tip and a bevel angle at both end portions of the bevel end portion is formed larger than that at the remaining portion and the cutting tip is welded to the metal body at the bevel end portion by adding Ni or Ni alloy as a filler metal, differentiating the amount of Ni in the edge portions of the securing region from the amount of Ni in the remaining portion can easily be performed because the amount of filler metal, i.e., the amount of Ni, becomes larger at the edge portion of the securing region.

If a nickel-plated layer is formed on a cutting tip securing surface of the metal body, and then the cutting tip is welded to the cutting tip securing surface of the metal body by melting the metal body and the nickel-plated layer, differentiating the amount of Ni in the edge portions of the securing region from the amount of Ni in the remaining portion can be easily performed because Ni contained in the nickel-plated layer formed on the corner and its adjacent surface increases the amount of Ni in the edge portions of the securing region.

Furthermore, if concave portions are formed on the edge portions of the cutting tip securing surface of the metal body and a nickel layer is formed by plating or spraying on the cutting tip securing surface of the metal body including the concave portions, and then the cutting tip is welded to the cutting tip securing surface of the metal body by heat-melting to the metal body and nickel layer, differentiating the amount of Ni in the edge portions of the securing region from that in the remaining portion can easily be performed because the nickel layer forms alloys having each layer containing a large amount of nickel at the edge portions of the securing region.

Alternatively, a nickel layer including nickel or nickel alloy may be formed on at least one of the securing surfaces of the metal body and the cutting tip such that the amount of nickel in the nickel layer of the edge portions of the securing region is larger than the amount of nickel in the remaining portion, and then the cutting tip may be welded to the metal body by heat melting the metal body and nickel plating layer. In this case, the amount of nickel in the metal layer located at the edge portions of the securing region can be increased.

Further, a nickel layer including nickel or nickel alloy may be formed on at least one of the securing surfaces of the metal body and the cutting tip such that the nickel layer of the edge portions of the securing region is thicker than the nickel layer in the remaining portion, and then the cutting tip may be welded to the metal body by melting the metal body and nickel layer to form alloy layers including a large amount of nickel at the edge portions of the securing region. In this case, a nickel layer having a desired thickness distribution can be easily obtained by shaving or cutting the nickel layer after the nickel layer is formed by plating or spraying.

A thin metal plate including nickel or nickel alloy may be disposed between the securing surfaces of the metal body and the cutting tip such that edges of the plate protrudes from a predetermined securing region of the metal body and the cutting tip, and then the cutting tip may be welded to the metal body by heat-welding the metal body and the plate. This also enables easy differentiation of the amount of nickel between the edge portions of the securing region and the remaining portion.

When a cemented carbide cutting tip is welded to a steel metal body by way of a metallic layer, the metallic layer may include different metals of different elements between the edge portions of the securing region of the metal body and the cutting tip and the remaining portion. This easily enables the formation of an extremely high-strength metallic portion and an extremely high-toughness metallic portion. Therefore, highly strong cutting tools can be easily produced.

In this case, the high-toughness metal and the high-strength metal may be disposed at the edge portions of the securing region and the remaining portion thereof, respectively, and the high-strength metal may be melted so as to weld the cutting tip to the metal body. Also, the high-toughness metal may be melted by the melting heat of the high-strength metal. This can prevent the high-toughness metal from sudden boiling without the necessity of controlling temperature even if the melting point of the high-toughness metal is considerably lower than the melting point of the high-strength metal, thereby enabling easy production of the cutting tool despite the fact that metals which are largely different in characteristics are melted for welding.

When the high-toughness metal and the high-strength metal is disposed at the edge portions of the securing region and the remaining portion thereof, respectively, and after welding the cutting tip to the base of the metal body at the edge area of the securing region by melting the high-toughness metal, the base of the metal body and the cutting tip may be welded by melting the high-strength metal. This reduces the thermal stress which occurs during the welding of the high-strength metallic portion and the cooling after the welding because the edge portions of the securing region, where stress tends to concentrate, are welded first, thereby preventing the generation of cracks in the high-strength metallic portion due to the heat stress and obtaining good welding strength.

In such a case where the high-toughness metal and the high-strength metal are disposed at the edge portions of the securing region and the remaining portion of the securing region, respectively, and the high-strength metal is provisionally secured to the metal body or the cutting tip by melting the high-toughness metal, and then the cutting tip is welded to the base of the metal body, it is easy to supply the material of the metallic layer and it is also easy and simple to perform the setting of the cutting tip, thereby enabling easy production of the cutting tool.

In such a case where the high-toughness metal and the high-strength metal are disposed at the edge portions of the securing region and the remaining portion of the securing region, respectively, and the high-strength metal and the high-toughness metal are provisionally secured to the metal body or the cutting tip at the same time by engaging the high-toughness metal to the metal body or the cutting tip, and then the cutting tip is welded to the base of the metal body, it is easy to provide the material of the metallic layer and it is also easy and simple to perform the setting of the cutting tip.

In such a case where the high-toughness metal and the high-strength metal are disposed at the edge portions of the securing region and the remaining portion thereof, respectively, and where simultaneously welding the high-strength metal and the high-toughness metal occurs, the cutting tip may be welded to the metal body and both the high-toughness metal portion and the high-strength metal portion may be melted and mixed at their boundary region to enable easy obtaining of a metallic layer in which the hardness gradually changes from the high-strength metallic portion to the high-toughness metallic portion located at the edge portions of the securing region.

In such a case where the high-toughness metal and the high-strength metal are disposed at the edge portions of the securing region and the remaining portion thereof, respectively, and where intermediate characteristic metals having intermediate characteristics between characteristics of the high-toughness metal and that of the high-strength metal are disposed between the high-toughness metal and the high-strength metal, and where the cutting tip is welded to the metal body by heat-melting the intermediate characteristic metals, it is easy to obtain a metallic layer in which the hardness gradually changes from the high-strength metallic portion to the high-toughness metallic portion located at the edge portions of the securing region.

In such a case where the high-toughness metal and the high-strength metal are disposed at the edge portions of the securing region and the remaining portion thereof, respectively, and the high-strength metal includes a plurality of layers having different thermal expansion rates, and then the cutting tip is welded to the metal body by heat-melting the high-toughness metal and the high-strength metal, it is easy to obtain a high-strength metallic portion in which the thermal expansion rate gradually changes from the side of the metal body to the side of the cutting tip.

In such a case where a mixture of WC powder and 6–20% of Co powder is disposed on the cutting tip and a mixture of WC powder and 40–60% Co powder is disposed on the metal body and Cu powder is disposed on the edge portions of the securing region, and then the cutting tip is welded to the metal body by heating the powders to sinter them, it is easy to obtain a high-strength metallic portion in which the thermal expansion rate gradually changes from the side of the base of the metal body to the side of the cutting tip.

The terms and expressions which have been employed herein are used as terms of description and not of limitation, and there is no intent, in the use of such terms and expressions, of excluding any equivalents of the features shown and described or portions thereof, but it should be recognized that various modifications are possible within the spirit and scope of the invention claimed.

What is claimed is:

1. A cutting tool, comprising:

a steel metal body; and a cemented carbide cutting tip secured to said metal body by a metallic layer, wherein said metallic layer has a high-strength metallic portion and a high-toughness metallic portion, said high-strength metallic portion being made of a metal having a thermal expansion rate between a thermal expansion rate of said metal body and a thermal expansion rate of said cutting tip, and said high-toughness metallic portion being located at edge portions of a securing region of said metal body and said cutting tip and having a toughness larger than a toughness of said high-strength metallic portion.

2. The cutting tool as recited in claim 1, wherein said high-strength metallic portion and said high-toughness metallic portion include at least one common element.

3. The cutting tool as recited in claim 2, wherein said high-strength metallic portion is made of an alloy including Fe-Ni as a main element, and said high-toughness metallic portion is made of an alloy including a larger amount of Ni than an amount of Ni in said high-strength metallic portion.

4. The cutting tool as recited in claim 1, wherein said high-strength metallic portion includes a main element and said high-toughness metallic portion includes a main element, said main element of said high-strength metallic portion being different from said main element of said high-toughness metallic portion.

5. The cutting tool as recited in claim 1, wherein said metallic layer gradually varies in hardness from said high-strength metallic portion to said high-toughness metallic portion located at said edge portions of said securing region.

6. The cutting tool as recited in claim 1, wherein said high-strength metallic portion gradually varies in a rate of thermal expansion from a side of said metal body to a side of said cutting tip.

* * * * *